Sept. 28, 1971  B. J. HUGLO  3,608,283

MOBILE SUCTION CLEANERS FOR PULVERULENT MATERIAL

Filed Oct. 29, 1968  2 Sheets-Sheet 1

United States Patent Office 3,608,283
Patented Sept. 28, 1971

3,608,283
MOBILE SUCTION CLEANERS FOR PULVERULENT MATERIAL
Bernard J. Huglo, Amiens, France, assignor to Manutair, Amiens, France
Filed Oct. 29, 1968, Ser. No. 771,438
Claims priority, application France, Nov. 10, 1967, 127,716
Int. Cl. B01d 46/10
U.S. Cl. 55—315      5 Claims

ABSTRACT OF THE DISCLOSURE

A mobile cleaning apparatus is provided for the cleaning of air containing pulverulent material, particularly dust. The apparatus includes a mobile carriage on which is mounted a separation container, a filtration container and suction means for inducing a flow of polluted air through both containers in order to purify it, the separation container being pivotably mounted on the carriage and detachable therefrom to facilitate its emptying. A connection for air flow from the separation container to the filtration container is completed when the separation container is supported in place on the carriage.

---

This invention relates to a mobile suction cleaner for pulverulent material e.g. dust. Such cleaners are intended for cleaning a locality having dust-laden surfaces and they can be moved from one locality to another.

It has previously been proposed to provide mobile cleaning apparatus which has on a mobile carriage, a separation container, in which settle the heaviest impurities in the air which have been sucked in, a filtration container which filters the remaining impurities, and a suction device which constantly sucks in air through flexible suction pipes, the separation container, and the filtration container, and which expels the purified air to atmosphere.

When the location to be cleaned is very dirty, as for instance in cement factories, the separation container fills up quickly and it is necessary to move the mobile cleaner to a given place at frequent intervals in order to empty the separation container and possibly the filtration container.

Since mobile cleaners of this type are heavy and bulky, they are generally drawn at low speed by a tractor to the place where it is emptied. The result is that these mobile cleaners are out of action at short intervals and for relatively long periods of time. Consequently it is necessary to increase the number of these mobile cleaners for treating a given amount of dust if it is desired to remain within reasonable operating conditions.

According to the present invention there is provided mobile cleaning apparatus for pulverulent material comprising a mobile carriage, a separation container detachably mounted on said carriage, a filtration container for receiving material laden air from the separation container, and means for inducing a flow of polluted air through the containers and expelling the air purified thereby.

In this way, it is not necessary to move the device itself since only the separation container is transported to a place where it is emptied. When the full separation container has been removed, another empty container can, if desired, be immediately put in its place, so that interruptions in the cleaning operation can be of extremely short duration.

By merely increasing the number of separation containers instead of the complete device it is possible to make an appreciable saving, and this is in addition to the fact that the transportation of the separation containers is less burdensome and simpler than that of complete devices.

Preferably, the present invention provides a particularly simple and effective means of mounting the detachable separation container, which simultaneously makes it possible to ensure the air-tightness of the air line between the air outlet from the separation container and the air inlet into the filtration container. By virtue of the invention this air-tightness is assured without any operation other than putting the separation container in place. For example, the separation container is pivotally mounted on the carriage of the mobile device, in such a way that after it has been put in place it tends to pivot under the effect of its own weight and is supported against the filtration container, the air outlet in the separation container and the air inlet in the filtration container thus coinciding.

Preferably, the separation containers and filtration containers are mounted in this order from the rear of the mobile carriage, the pivoting taking place about two aligned journals below the center of gravity of the separation container, the outlet of the separation container being directed downwardly and being in an oblique plane in relation to the vertical and being formed by the outlet of a pipe projecting from the upper part of one of the walls of the separation container which is adjacent to the filtration container. The inlet into the filtration container lies in a substantially parallel plane to that of the outlet of the separation container. A packing can be provided at the edge of one of the openings, so that when the separation container pivots about its journals, this packing is compressed by the edge of the other opening, thus ensuring the air-tightness of the air connection between the two containers.

An embodiment of the present invention will now be described, by way of example with reference to the accompanying drawing, in which.

Figure 1:
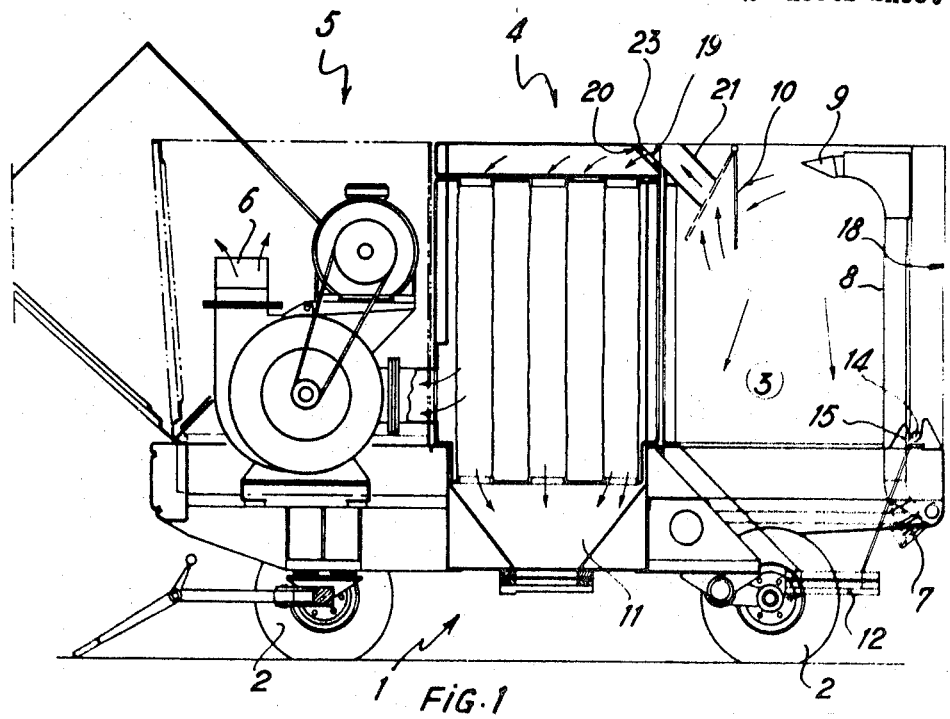
FIG. 1 is a side elevation view partly in longitudinal section through the complete mobile cleaner.

In FIG. 1 there is shown a mobile cleaning device for the suction of pulverulent granules such as dust and the purification of the atmosphere in which these granules are entrained. This device comprises a mobile carriage 1, mounted on wheels 2. Going from the back to the front of the carriage and in the direction of the circulation of the air to be purified, this carriage comprises a separation container 3, a filtration container 4 and a device 5 which sucks in the polluted air through the two containers 3 and 4 and expels pure air through an opening 6.

The polluted air which is sucked in enters the separation container 3 through the opening 7, along piping 8, and finally emerges at outlet 9 towards the upper part of the container. A pivotable deflector 10 prevents the polluted air from passing directly into the filtration container. In the separation container the air discards its heaviest impurities which collect at the bottom due to gravity. Thus the separated air then passes into the filtration container 4 also entering it at the top. The filtered air is finally expelled into the atmosphere at 6. The impurities collected in the filtration container 4 can be removed through the bottom of a hopper 11 which has a valve which is controlled manually.

According to the present invention, the separation container 3 is detachably mounted on the carriage 1, in such a way that it can be conveyed separately in order to be emptied through the bottom valve 12.

For this purpose the container 3 is pivotally mounted on the carriage by means of two journals 13, 14, resting on two seatings or cradles 15 which are open at the top. These journals are fixed on side walls 16, 17 of the container 3, at points close to rear wall 18 and lower than the center of gravity of the container 3.

According to the present invention, both an air outlet 19 from the separation container 3 and an air inlet 20 into the filtration container 4 are arranged such that the air-tightness of the air line through these two openings 19, 20 is assured by the weight of the separation container 3 tending to pivot, under the effect of its own weight, about journals 13 and 14.

The outlet 19 constitutes the outlet of a pipe 21 which projects partially beyond that wall of the separation container 3, which is adjacent to the filtration container 4 and lies in an oblique plane in relation to the vertical.

The inlet opening 20 is situated on an oblique plane, virtually parallel to the outlet 19, in one of the upper corners of the filtration container 4, next to the separation container, in such a way that the inlet 20 is in register with the outlet of the pipe 21.

A packing 23 is provided on the periphery of the inlet opening 20 of the fixed container 4 in order to ensure air-tightness between the two openings 19, 20 by compression due to the weight of the separation container 3.

Preferably a spacing ring is fixed on the periphery of one of the two openings 19, 20 in order to prevent collapse of the packing 23.

Figure 2:
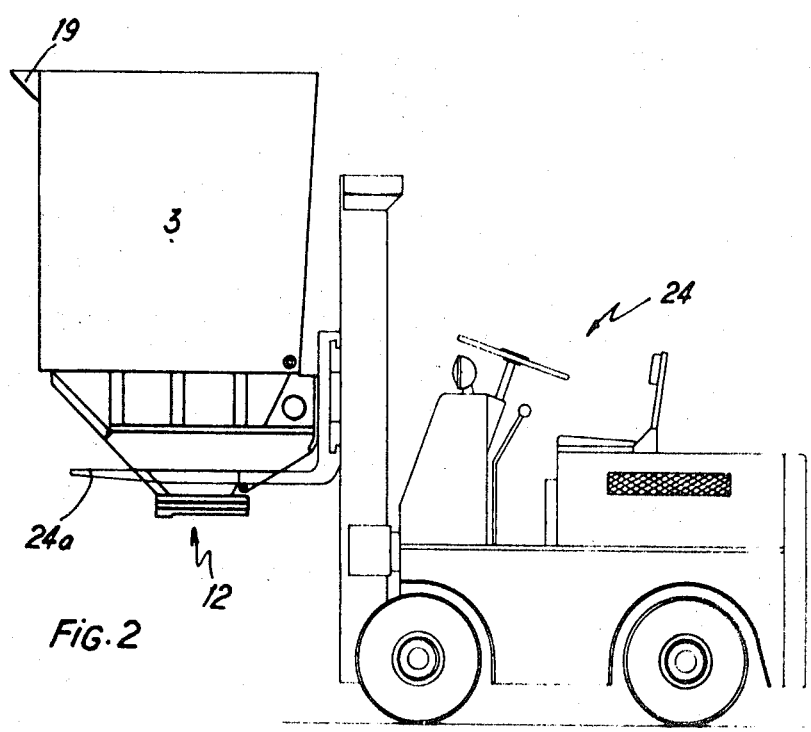
FIG. 2 is a side elevation view diagrammatically showing the transportation of the separation container according to the invention.
Figure 3:
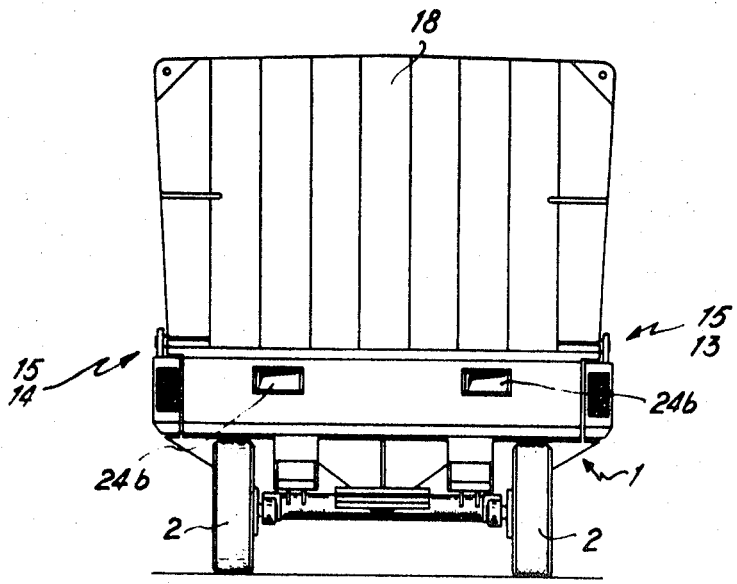
FIGS. 3 and 4 show a rear view and a front view respectively of the separation container according to the invention.
Figure 4:
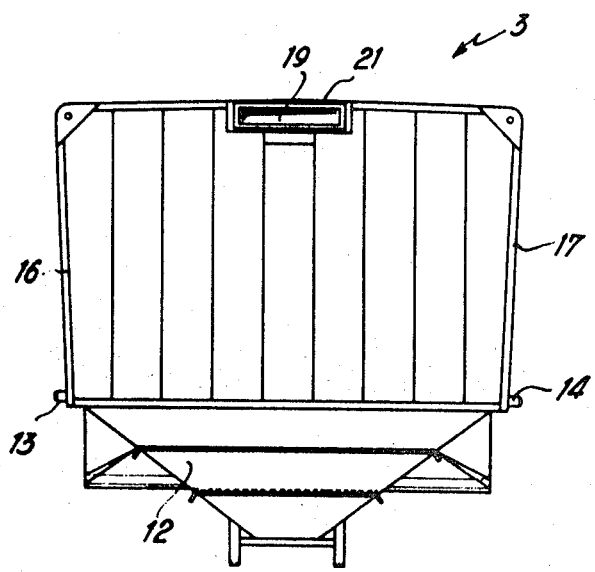

From FIG. 2 it can be seen how the container 3 can be conveyed by means of a fork-lift truck 24, the forks 24a of which can engage in locations 24b provided on the container 3.

The only maneuver required to locate the container 3 in position on the carriage 1 is the location of the journals 13, 14 in the seatings 15. The container 3 then pivots under its own weight in order to rest against the filtration container 4 in the region of the air line.

The combination of the pivotal movement of the separation container 3 and the appropriate arrangement of the air openings which serve as contact regions for limiting the pivotal movement simultaneously ensure simple mounting of the container 3 and an excellent air-tightness.

What is claimed is:

1. Mobile cleaning apparatus for pulverulent material comprising a mobile carriage, a separation container, means detachably mounting said separation chamber on said carriage, a filtration container on said carriage for receiving material laden air from the separation container, and means for inducing a flow of polluted air through the containers and for expelling the air purified thereby, said means detachably mounting the separation chamber on the carriage comprising means mounting the separation container on the carriage for pivotable movement about an eccentric axis relative to its center of gravity, an air outlet on the separation container, and an air inlet on the filtration container, said air outlet and air inlet being disposed so that they abut in register with each other to limit pivotal movement of the separation container under its own weight.

2. Apparatus as claimed in claim 1, comprising an oblique pipe projecting from the separation container towards the filtration container, said air outlet being provided in said pipe, said air inlet to the filtration container being upwardly directed and adapted to lie in a plane substantially parallel to the axis of the pipe when said outlet and inlet are in register with each other.

3. Apparatus as claimed in claim 1, wherein said means which pivotably mounts the container on the carriage comprises a pair of journals fixed to the separation container at the lower portion thereof, and a pair of cradles mounted on the carriage and in which the journals are detachably engaged so as to permit pivotal movement of the container about said journals.

4. Apparatus as claimed in claim 3, wherein said cradles are open upwards for receiving and for removal of said journals.

5. Apparatus as claimed in claim 1, comprising a packing located around the periphery of one of the air outlet and air inlet to ensure the air-tightness of the air connection between the two containers when they abut against each other.

References Cited

UNITED STATES PATENTS

| 2,678,462 | 5/1954 | Lison et al. | 15—352X |
| 1,560,612 | 11/1925 | Sims | 15—340X |

FOREIGN PATENTS

| 526,094 | 6/1931 | Germany | 15—340 |
| 586,787 | 12/1958 | Italy | 15—340 |
| 171,879 | 11/1965 | U.S.S.R. | 15—340 |

WALTER A. SCHEEL, Primary Examiner

A. I. CANTOR, Assistant Examiner

U.S. Cl. X.R.

15—352; 55—356